US010605338B2

(12) United States Patent
Okamoto

(10) Patent No.: US 10,605,338 B2
(45) Date of Patent: Mar. 31, 2020

(54) VARIABLE-SPEED SPEED INCREASER

(71) Applicant: MITSUBISHI HEAVY INDUSTRIES COMPRESSOR CORPORATION, Tokyo (JP)

(72) Inventor: Yoshiyuki Okamoto, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 55 days.

(21) Appl. No.: 16/078,897

(22) PCT Filed: Feb. 26, 2016

(86) PCT No.: PCT/JP2016/055776
§ 371 (c)(1),
(2) Date: Aug. 22, 2018

(87) PCT Pub. No.: WO2017/145351
PCT Pub. Date: Aug. 31, 2017

(65) Prior Publication Data
US 2019/0093742 A1    Mar. 28, 2019

(51) Int. Cl.
*F16H 3/72*    (2006.01)
*F16D 41/18*    (2006.01)

(52) U.S. Cl.
CPC .......... *F16H 3/724* (2013.01); *F16D 41/185* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS 4,514,991 A * 5/1985 Zinsmeyer ................ F16H 3/72
475/2
5,030,181 A   7/1991 Keller
(Continued)

FOREIGN PATENT DOCUMENTS

EP    1283359 A1    2/2003
JP    S49-057740 U    5/1974
(Continued)

OTHER PUBLICATIONS

Notice of Reasons for Refusal in corresponding Japanese Application No. 2018-501520, dated Aug. 6, 2019 (6 pages).
(Continued)

*Primary Examiner* — Dirk Wright
(74) *Attorney, Agent, or Firm* — Osha Liang LLP

(57) ABSTRACT

A variable-speed speed increaser includes: an electric driving device which is configured to generate a rotational driving force; and a transmission device which is configured to change the speed of the rotational driving force generated by the electric driving device and transmit the changed rotation driving force to a driving target. The transmission device includes a sun gear which is configured to rotate about an axis, a sun gear shaft which is fixed to the sun gear and extend in an axial direction around the axis, a planetary gear which is configured to mesh with the sun gear, revolve around the axis and rotate about its own center line, an internal gear which has a plurality of teeth aligned annularly around the axis and is configured to mesh with the planetary gear, and a planetary gear carrier which has a planetary gear carrier shaft.

4 Claims, 7 Drawing Sheets

(56) References Cited

U.S. PATENT DOCUMENTS

| | | | |
|---|---|---|---|
| 6,358,172 B1* | 3/2002 | Hiegemann | F16H 3/72 |
| | | | 475/329 |
| 8,534,408 B2* | 9/2013 | Kajihara | B62M 7/12 |
| | | | 180/205.1 |
| 10,177,692 B2* | 1/2019 | Kobayashi | H02K 7/003 |
| 10,415,675 B2* | 9/2019 | Erjavec | F16H 61/66 |
| 10,454,394 B2* | 10/2019 | Okamoto | F16H 3/724 |
| 10,465,774 B2* | 11/2019 | Okamoto | F16H 3/72 |
| 2005/0113201 A1 | 5/2005 | Kimura et al. | |
| 2010/0276942 A1 | 11/2010 | Hicks et al. | |
| 2017/0141706 A1 | 5/2017 | Kobayashi et al. | |
| 2017/0155345 A1* | 6/2017 | Kobayashi | H02P 6/04 |
| 2018/0187778 A1* | 7/2018 | Okamoto | F16H 3/724 |
| 2018/0252300 A1* | 9/2018 | Okamoto | F16H 61/0246 |
| 2019/0048979 A1* | 2/2019 | Okamoto | F16H 3/724 |
| 2019/0068090 A1* | 2/2019 | Okamoto | F04D 25/028 |
| 2019/0093742 A1* | 3/2019 | Okamoto | F16D 41/185 |
| 2019/0113111 A1* | 4/2019 | Okamoto | H02K 9/06 |
| 2019/0170221 A1* | 6/2019 | Okamoto | F16H 3/725 |
| 2019/0181779 A1* | 6/2019 | Okamoto | F16H 3/72 |
| 2019/0186600 A1* | 6/2019 | Miyata | F16H 3/72 |
| 2019/0226557 A1* | 7/2019 | Okamoto | F16H 3/72 |

FOREIGN PATENT DOCUMENTS

| | | |
|---|---|---|
| JP | S63-099031 U | 6/1988 |
| JP | H02-502747 A | 8/1990 |
| JP | H04-010871 Y | 3/1992 |
| JP | H04-034102 Y | 8/1992 |
| JP | 4472350 B2 | 6/2010 |
| JP | 2011-529539 A | 12/2011 |
| WO | 03/071160 A1 | 8/2003 |
| WO | 2016/010146 A1 | 1/2016 |

OTHER PUBLICATIONS

International Search Report for corresponding International Application No. PCT/JP2016/055776, dated Apr. 19, 2016 (4 pages).
Written Opinion for corresponding International Application No. PCT/JP2016/055776, dated Apr. 19, 2016 (9 pages).

* cited by examiner

VARIABLE-SPEED SPEED INCREASER

FIELD OF THE INVENTION

The present invention relates to a variable-speed speed increaser which includes an electric driving device including a constant-speed motor and a variable-speed motor, and a planetary gear transmission device for changing the speed of a rotational driving force generated by the electric driving device and then transmitting the speed-changed rotational driving force to a driving target.

BACKGROUND ART

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio.

CITATION LIST

Patent Document

[Patent Document 1]
Japanese Patent Publication No. 4472350

SUMMARY OF INVENTION

Technical Problem

In the above-mentioned apparatus, when the apparatus is intended to be urgently stopped, as the power supply is cut off, the rotation rate of the constant-speed motor and the rotary machine which is a driving target is spontaneously reduced. On the other hand, in the variable-speed motor, the rotation rate may be determined by the rotation rate of the constant-speed motor or the inertia of the rotary machine. Accordingly, there is a problem that the rotation rate of the variable-speed motor becomes larger than a rated rotation rate.

The present invention relates to a variable-speed speed increaser which includes an electric driving device including a constant-speed motor and a variable-speed motor, and a planetary gear transmission device for changing the speed of a rotational driving force generated by the electric driving device and then transmitting the speed-changed rotational driving force to a driving target, and it is an object of the present invention to provide a variable-speed speed increaser capable of safely disconnecting a variable-speed motor from a transmission device when an apparatus is urgently stopped.

Solution to Problem

According to a first aspect of the present invention, there is provided a variable-speed speed increaser including an electric driving device which is configured to generate a rotational driving force, and a transmission device which is configured to change the speed of the rotational driving force generated by the electric driving device and transmit the changed rotation driving force to a driving target, wherein the transmission device includes a sun gear which is configured to rotate about an axis, a sun gear shaft which is fixed to the sun gear and extends in an axial direction around the axis, a planetary gear which is configured to mesh with the sun gear, revolve around the axis and rotate about its own center line, an internal gear which has a plurality of teeth aligned annularly around the axis and is configured to mesh with the planetary gear, a planetary gear carrier which has a planetary gear carrier shaft extending in the axial direction around the axis and is configured to support the planetary gear to revolve around the axis and to be rotatable around a center line of the planetary gear itself, and an internal gear carrier which has an internal gear carrier shaft extending in the axial direction around the axis and is configured to support the internal gear to be rotatable about the axis, the sun gear shaft forms an output shaft connected to the driving target, the internal gear carrier shaft forms a constant-speed input shaft, and the planetary gear carrier shaft forms a variable-speed input shaft, the electric driving device includes a variable-speed motor having a variable-speed rotor which is connected to the variable-speed input shaft of the transmission device and formed in a cylindrical shape centered on the axis and has a shaft insertion hole passing therethrough in the axial direction, and a constant-speed motor having a constant-speed rotor which is connected to the constant-speed input shaft of the transmission device and inserted through the shaft insertion hole, a rotor of the driving target is disposed on the axis, the variable-speed speed increaser further includes a claw clutch which connects the variable-speed rotor with the variable-speed input shaft, and the claw clutch includes a first clutch engaging element provided on a side of the variable-speed rotor, a second clutch engaging element provided on a side of the variable-speed input shaft, and a moving device which is configured to move one of the first clutch engaging element and the second clutch engaging element in the axial direction.

According to such a constitution, the variable-speed motor can be prevented from rotating at a rotation rate higher than the rated rotation rate by disengaging the claw clutch when the variable-speed speed increaser is stopped urgently.

In the variable-speed speed increaser, the first clutch engaging element may have a plurality of first clutch pawls, the second clutch engaging element may have a plurality of second clutch pawls which are configured to engage with the plurality of first clutch pawls, each of the second clutch pawls may have a second transmission surface along a plane including the axis, and each of the first clutch pawls may have a first transmission surface which is in surface contact with the second transmission surface and is formed so that power is transmitted from the first transmission surface to the second transmission surface during an operation of the variable-speed speed increaser.

According to such a constitution, since a component which acts in the axial direction in which the first clutch pawls and the second clutch pawls are disengaged does not occur from the torque of the variable-speed motor acting in the circumferential direction, the first clutch engaging element and the second clutch engaging element are not disengaged from each other.

In the variable-speed speed increaser, the moving device may include an electromagnet which is configured to attract the variable-speed rotor using an electromagnetic force to separate the first clutch engaging element and the second clutch engaging element from each other.

According to such a constitution, it is possible to disconnect the claw clutch by energizing the electromagnet only when the variable-speed speed increaser is urgently stopped.

In the variable-speed speed increaser, the first clutch engaging element may have a plurality of first clutch pawls, the second clutch engaging element may have a plurality of second clutch pawls which are configured to engage with the plurality of first clutch pawls, each of the second clutch pawls may have a second transmission surface which is inclined with respect to a plane including the axis, each of the first clutch pawls may have a first transmission surface which is in surface contact with the second transmission surface and is formed so that power is transmitted from the first transmission surface to the second transmission surface during an operation of the variable-speed speed increaser, and the moving device may attract the variable-speed rotor using an electromagnetic force to engage the first clutch engaging element and the second clutch engaging element.

Advantageous Effects of Invention

According to the present invention, the variable-speed motor can be prevented from rotating at a rotation rate higher than the rated rotation rate by disengaging the claw clutch when the variable-speed speed increaser is urgently stopped.

DESCRIPTION OF EMBODIMENTS

First Embodiment

Hereinafter, a variable-speed speed increaser according to a first embodiment of the present invention will be described in detail with reference to the drawings.

Figure 1:
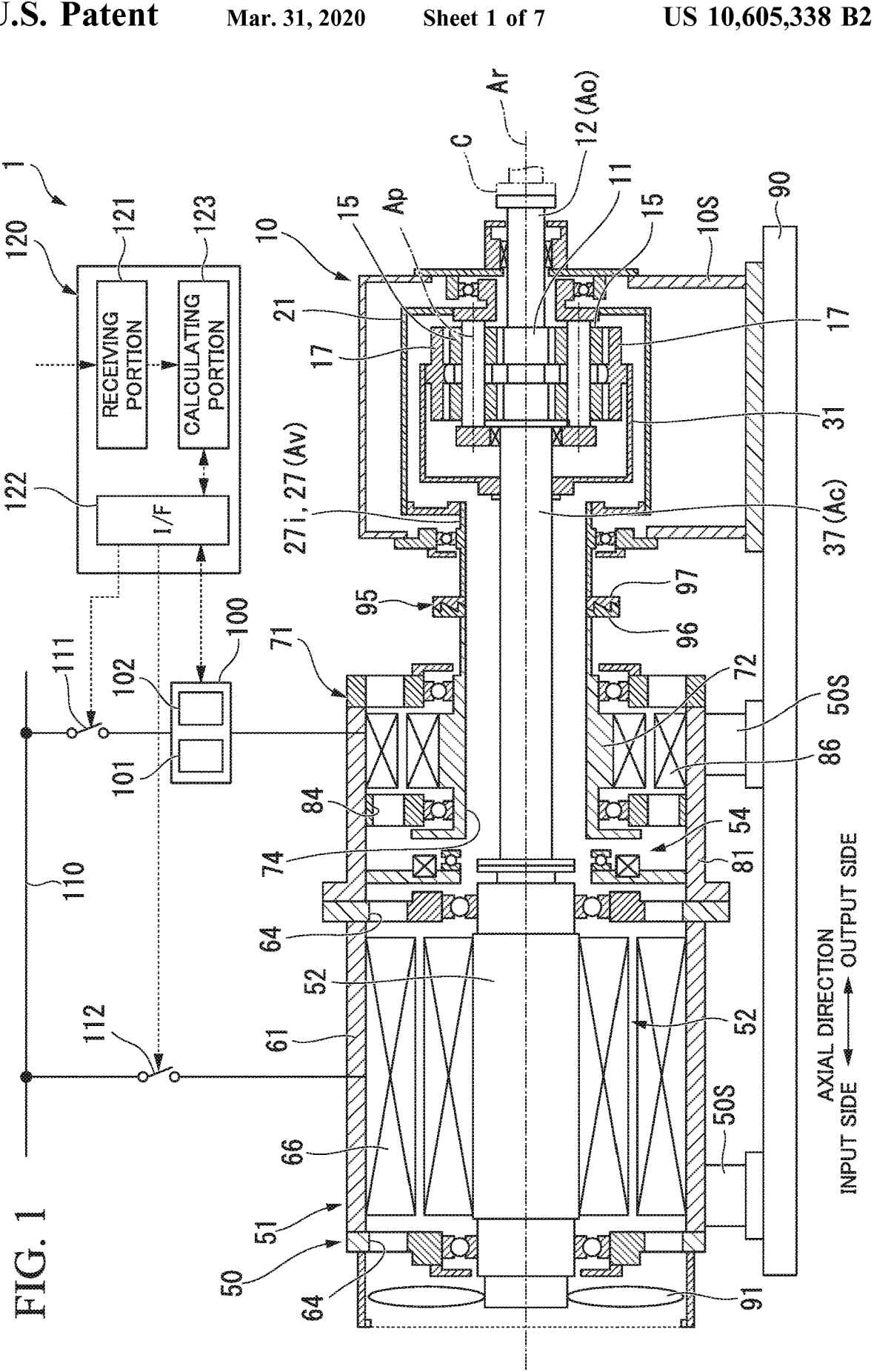
FIG. 1 is a cross-sectional view of a variable-speed speed increaser according to a first embodiment of the present invention.

As shown in FIG. 1, the variable-speed speed increaser 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable-speed speed increaser 1 can be applied to, for example, a fluid mechanical system such as a compressor system.

Figure 2:
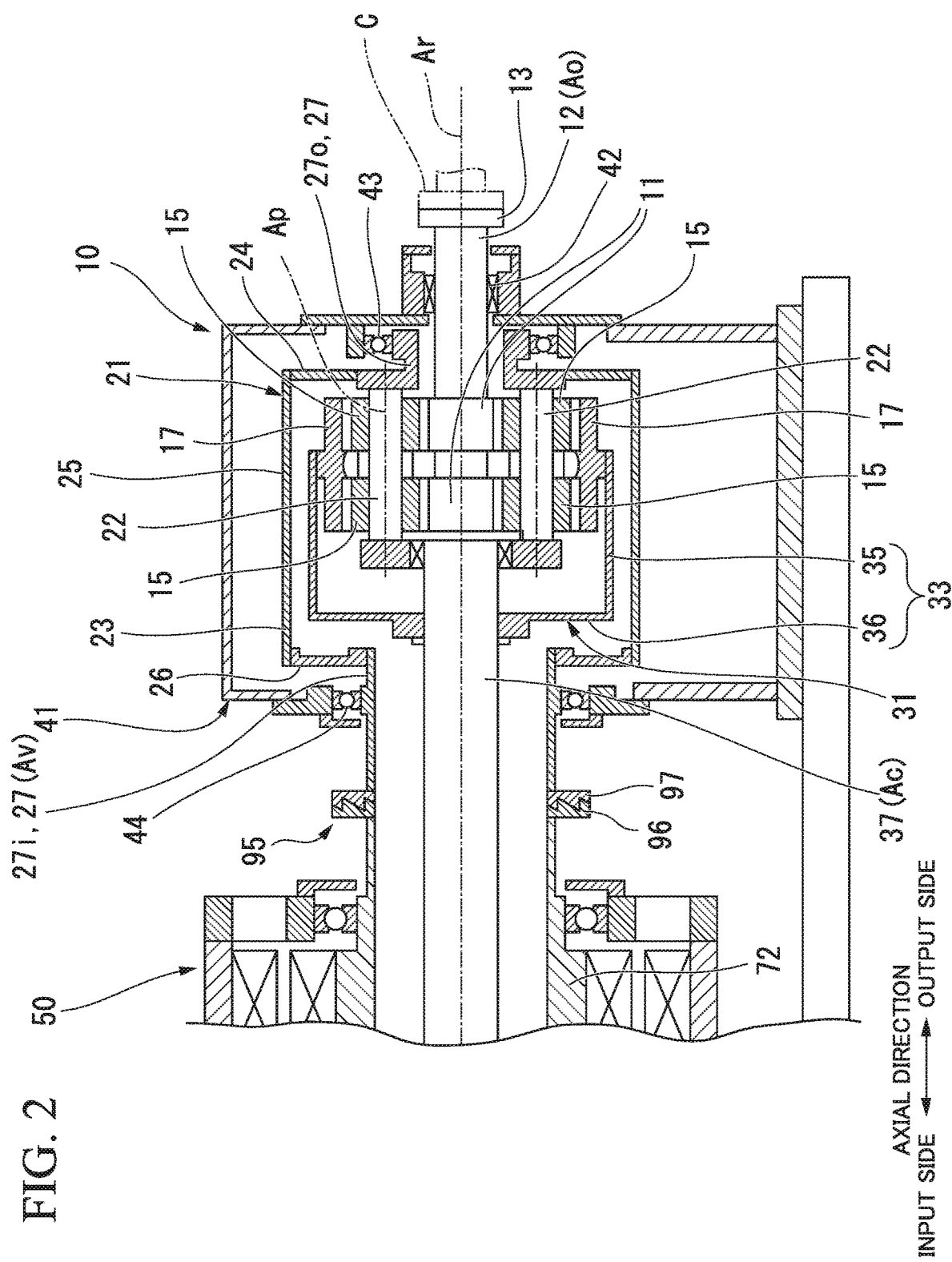
FIG. 2 is a cross-sectional view of a transmission device according to the first embodiment of the present invention.

The transmission device 10 is a planetary gear transmission device. As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotates about their own center lines Ap, an internal gear 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes a planetary gear shaft 22 provided for each of the plurality of planetary gears 15, a carrier main body 23 which fixes the relative positions of the plurality of planetary gear shafts 22, and a planetary gear carrier shaft 27 which is fixed to the carrier main body 23 and extends in the axial direction centered on the axis Ar.

The planetary gear shaft 22 passes through the center lines Ap of the planetary gears 15 in the axial direction and supports the planetary gears 15 to allow the planetary gears 15 to rotate about a center line thereof. The carrier main body 23 includes an output-side arm portion 24 extending outward in the radial direction from the plurality of planetary gear shafts 22, a cylindrical portion 25 which has a cylindrical shape centered on the axis Ar and extends from the radially outer end of the output-side arm portion 24 toward the input side, and an input-side arm portion 26 which extends inward in the radial direction from the output-side end of the cylindrical portion 25.

The planetary gear carrier shaft 27 includes an output-side planetary gear carrier shaft 27o which extends from the output-side arm portion 24 toward the output side, and an input-side planetary gear carrier shaft 27i which extends from the input-side arm portion 26 toward the input side. Both of the output-side planetary gear carrier shaft 27o and the input-side planetary gear carrier shaft 27i form a cylindrical shape centered on the axis Ar.

The output-side planetary gear carrier shaft 27o is supported to be rotatable about the axis Ar by a planetary gear carrier bearing 43 disposed on the output side beyond the output-side arm portion 24. The planetary gear carrier bearing 43 is installed at the transmission casing 41. The sun gear shaft 12 is inserted through the inner circumferential side of the output-side planetary gear carrier shaft 27o.

The input-side planetary gear carrier shaft 27i is supported to be rotatable about the axis Ar by a planetary gear carrier bearing 44 disposed on the input side beyond the input-side arm portion 26. The planetary gear carrier bearing 44 is installed at the transmission casing 41.

The internal gear carrier 31 includes a carrier main body 33 to which the internal gear 17 is fixed and an internal gear carrier shaft 37 which is fixed to the carrier main body 33 and extends in the axial direction centered on the axis Ar.

The carrier main body 33 includes a cylindrical portion 35 which has a cylindrical shape centered on the axis Ar and has the internal gear 17 fixed to the inner circumferential side thereof, and an input-side arm portion 36 which extends inward in the radial direction from the input-side end of the cylindrical portion 35.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. The internal gear carrier shaft 37 is inserted through the inner circumferential side of the cylindrical input-side planetary gear carrier shaft 27*i*.

The electric driving device 50 includes a constant-speed motor 51 which rotates the internal gear carrier shaft 37 at a constant speed and a variable-speed motor 71 which rotates the input-side planetary gear carrier shaft 27*i* at an arbitrary rotation rate.

The internal gear carrier shaft 37 is a constant-speed input shaft Ac which rotates at a constant speed under a driving force of the constant-speed motor 51. The input-side planetary gear carrier shaft 27*i* is a variable speed input shaft Av which rotates at an arbitrary rotation rate under a driving force of the variable-speed motor 71.

The variable-speed speed increaser 1 can change the rotation rate of an output shaft Ao of the transmission device 10 connected to the driving target by changing the rotation rate of the variable-speed motor 71.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 3:
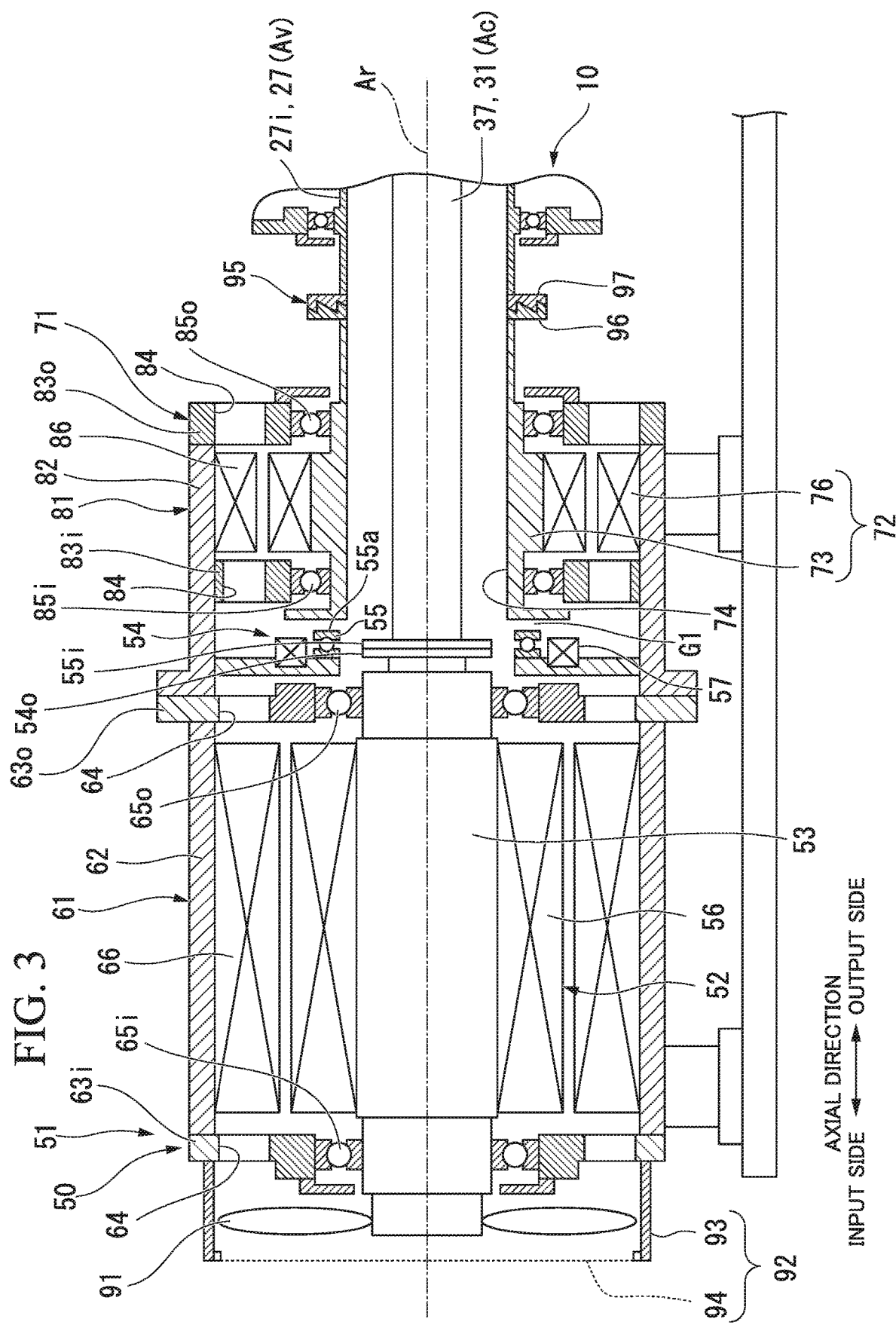
FIG. 3 is a cross-sectional view of an electric driving device according to the first embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27*i* of the transmission device 10. The electric driving device 50 has a cooling fan 91 which cools the constant-speed motor 51 and the variable-speed motor 71, and a fan cover 92 which covers the cooling fan 91.

In the embodiment, the constant-speed motor 51 is, for example, a three-phase four-pole induction motor. Further, the variable-speed motor 71 is a six-pole induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed motor 51 rotationally drives the constant-speed rotor 52 in a first direction (positive direction) of the circumferential direction of the axis Ar. As the constant-speed rotor 52 rotates in the first direction, the internal gear carrier shaft 37 and the internal gear carrier 31 rotate in the first direction.

The constant-speed rotor 52 includes a constant-speed rotor shaft 53 which has a column shape around the axis Ar, and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is faulted of a plurality of coils.

The constant-speed motor casing 61 includes a casing main body 62 having a cylindrical shape centered on the axis Ar and in which the constant-speed stator 66 is fixed to the inner circumferential side thereof, and covers 63*i* and 63*o* which close both axial ends of the cylindrical casing main body 62. Constant-speed rotor bearings 65*i* and 65*o* are installed at the respective covers 63*i* and 63*o* to rotatably support the constant-speed rotor shaft 53 about the axis Ar. A plurality of openings 64 axially passing through the respective covers 63*i* and 63*o* at positions radially outward from the constant-speed rotor bearings 65*i* and 65*o* are formed in the respective covers 63*i* and 63*o*.

The input-side end of the constant-speed rotor shaft 53 protrudes toward the input side from the input-side cover 63*i* of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes a cylindrical cover main body 93 disposed on the outer circumferential side of the cooling fan 91, and an air circulating plate 94 installed at an opening of the cover main body 93 on the inlet side and having a plurality of air holes formed therein. The fan cover 92 is fixed to the cover 63*i* of the constant-speed motor casing 61 on the input side.

The variable-speed motor 71 includes a variable-speed rotor 72 which rotates about the axis Ar and is connected to the input-side planetary gear carrier shaft 27*i* which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed motor 71 rotationally drives the variable-speed rotor 72 in the first direction of the circumferential direction of the axis Ar and a second direction opposite to the first direction. That is, the variable-speed motor 71 can rotate forwardly and reversely.

The variable-speed motor 71 serves as a generator by rotating the variable-speed rotor 72 in the first direction. A state in which the variable-speed motor 71 serves as a generator is referred to as a generator mode. That is, the variable-speed rotor 72 of the variable-speed motor 71 rotates in the first direction in the generator mode.

The variable-speed motor 71 serves as an electric motor by rotating the variable-speed rotor 72 in the second direction opposite to the first direction. A state in which the variable-speed motor 71 serves as an electric motor is referred to as an electric motor mode. That is, the variable-speed rotor 72 of the variable-speed motor 71 rotates in the second direction in the electric motor mode.

As the variable-speed rotor 72 rotates in the first direction, the planetary gear carrier shaft 27 and the planetary gear carrier 21 rotate in the first direction.

The variable-speed rotor 72 has a variable-speed rotor shaft 73 and a conductive body 76 fixed to the outer circumference of the variable-speed rotor shaft 73. The variable-speed rotor shaft 73 has a cylindrical shape around the axis Ar and has a shaft insertion hole 74 passing through the variable-speed rotor shaft 73 in the axial direction. The internal gear carrier shaft 37 is inserted through the shaft insertion hole 74 of the variable-speed rotor shaft 73 as the constant-speed input shaft Ac.

The variable-speed stator 86 is disposed radially outward from the conductive body 76 of the variable-speed rotor 72. The variable-speed stator 86 is formed of a plurality of coils.

The variable-speed motor casing 81 includes a casing main body 82 having a cylindrical shape around the axis Ar and to the inner circumferential side thereof of which the variable-speed stator 86 is fixed, an output-side cover 83o which closes the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which support the variable-speed rotor shaft 73 to be rotatable about the axis Ar and to be movable in the axial direction are installed at the respective covers 83i and 83o. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

Further, in the variable-speed speed increaser 1 of the embodiment, the constant-speed rotor 52, the variable-speed rotor 72 and the sun gear shaft 12 are arranged on the same axis.

The variable-speed speed increaser 1 of the embodiment includes a claw clutch 95 disposed between the input-side planetary gear carrier shaft 27i, which is the variable-speed input shaft Av and the variable-speed rotor 72, to connect them. The claw clutch 95 is a clutch which has a pair of pawls engaged with each other and interrupts rotation by engaging and disengaging the pair of pawls.

As shown in FIG. 3, the claw clutch 95 includes a first clutch engaging element 96 provided at an end of the variable-speed rotor 72, a second clutch engaging element 97 provided at an end of the input-side planetary gear carrier shaft 27i, and a moving device 54 which disconnects the claw clutch 95.

Figure 4:
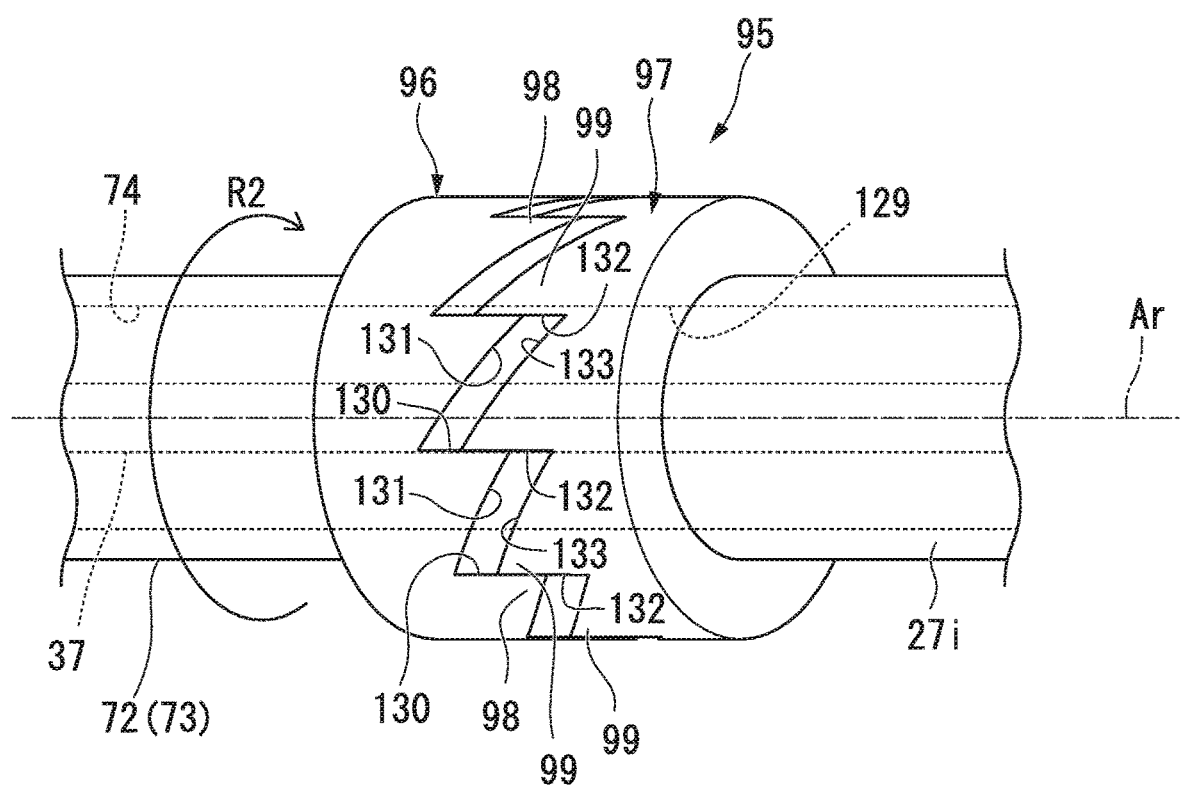
FIG. 4 is a perspective view of a claw clutch according to the first embodiment of the present invention.

As shown in FIG. 4, the claw clutch 95 has a through-hole 129 similar to the shaft insertion hole 74 formed in the variable-speed rotor shaft 73.

The first clutch engaging element 96 has a plurality of first clutch pawls 98 formed at regular intervals in the circumferential direction. The second clutch engaging element 97 has a plurality of second clutch pawls 99 which are formed at regular intervals in the circumferential direction and engage with the plurality of first clutch pawls 98. The first clutch pawl 98 and the second clutch pawl 99 engage with each other.

The first clutch pawls 98 and the second clutch pawls 99 are triangularly shaped pawls. The first clutch pawl 98 has a first transmission surface 130, and a first inclined surface 131 which connects the distal end of the first transmission surface 130 with the proximal end of the first transmission surface 130 adjacent in the circumferential direction. The first transmission surface 130 is a surface orthogonal to the circumferential direction and is a surface along a plane including the axis Ar.

The second clutch pawl 99 has a second transmission surface 132 which is in surface contact with the first transmission surface 130, and a second inclined surface 133 which connects the distal end of the second transmission surface 132 with the proximal end of the second transmission surface 132 adjacent in the circumferential direction. The second transmission surface 132 is a surface orthogonal to the circumferential direction and is a surface along a plane including the axis Ar.

As described above, the variable-speed motor 71 in the electric motor mode rotates the variable-speed rotor 72 in the second direction R2. A torque direction of the variable-speed rotor 72 of the variable-speed motor 71 in the electric motor mode is the same as the second direction R2.

Also, the variable-speed motor 71 in the generator mode rotates the variable-speed rotor 72 in the first direction. The torque direction of the variable-speed rotor 72 of the variable-speed motor 71 in the electric motor mode is the same as the second direction R2. That is, regardless of whether the variable-speed motor 71 is in the electric motor mode or the generator mode, the torque direction of the variable-speed rotor 72 is constant during the operation of the variable-speed speed increaser.

The first clutch pawls 98 and the second clutch pawls 99 are formed to transmit power from the first transmission surface 130 to the second transmission surface 132 during the operation of the variable-speed speed increaser 1. That is, the first transmission surface 130 of the embodiment is a surface which faces the front side in the second direction R2.

As described above, since the torque direction of the variable-speed rotor 72 is constant during the operation of the variable-speed speed increaser 1, the power is constantly transmitted from the first transmission surface 130 to the second transmission surface 132.

In addition, since the first transmission surface 130 and the second transmission surface 132 are surfaces including the axis Ar, the first clutch pawls 98 and the second clutch pawls 99 are not disengaged from each other due to the torque of the variable-speed rotor 72. Since the first transmission surface 130 and the second transmission surface 132 are formed to be orthogonal to the torque direction (the second direction R2), no force acts in a direction in which the first clutch engaging element 96 and the second clutch engaging element 97 are disengaged when the power is transmitted from the first transmission surface 130 to the second transmission surface 132.

As shown in FIG. 3, the moving device 54 includes a thrust bearing 55 and an electromagnet 57 which are fixed to the variable-speed motor casing 81.

The thrust bearing 55 and the electromagnet 57 are disposed on the input side of the input-side end of the variable-speed rotor 72. The thrust bearing 55 is an annular bearing provided on the outer circumferential side of the constant-speed rotor shaft 53. When the variable-speed rotor 72 supported movably in the axial direction by the variable-speed rotor bearings 85i and 85o moves to the input side, it comes into contact with the thrust bearing 55.

A predetermined gap G1 is formed between the thrust bearing 55 and the input-side end of the variable-speed rotor 72.

The variable-speed rotor shaft 73 of the variable-speed rotor 72 of the embodiment is a magnetic body. That is, the variable-speed rotor 72 is attracted by an electromagnetic force of the electromagnet 57.

The electromagnet 57 is provided on the outer circumferential side of the constant-speed rotor shaft 53 and is connected to a power source (not shown). When the electromagnet 57 is energized, a magnetic force is generated and the variable-speed rotor 72 is attracted.

A support surface 55a on the output side of the thrust bearing 55 is disposed on the output side of the electromagnet 57. That is, even when the variable-speed rotor 72 moves to the input side under the attraction force of the electromagnet 57, the variable-speed rotor 72 does not come into contact with the electromagnet 57.

The variable-speed speed increaser 1 of the embodiment includes the rotation rate controller 100 which controls the rotation rate of the variable-speed motor 71, a first switch 111 which sets the variable-speed motor 71 to be in a power supply state and a power cutoff state, a second switch 112 which sets the constant-speed motor 51 to be in the power supply state and the power cutoff state, and a controller 120 which controls operations of the rotation rate controller 100, the first switch 111 and the second switch 112.

The controller 120 is constituted of a computer. The controller 120 includes a receiving portion 121 which directly receives an instruction from an operator or receives an instruction from a host control device, an interface 122 which provides instructions to the first switch 111, the rotation rate controller 100 and the second switch 112, and a calculating portion 123 which creates instructions for the first switch 111, the second switch 112 and the rotation rate controller 100 according to the instructions received by the receiving portion 121 or the like.

The first switch 111 is electrically connected to a power source line 110 and the rotation rate controller 100. The rotation rate controller 100 is electrically connected to the variable-speed motor 71. The second switch 112 is electrically connected to the power source line 110 and the constant-speed motor 51.

The first switch 111 is turned on by an on instruction from the controller 120 and turned off by an off instruction from the controller 120. When the first switch 111 is turned on, electric power from the power source line 110 is supplied to the variable-speed motor 71 through the rotation rate controller 100, and the variable-speed motor 71 is in the power supply state. When the first switch 111 is turned off, the power supply from the power source line 110 to the rotation rate controller 100 and the variable-speed motor 71 is cut off, and the variable-speed motor 71 is in the power cutoff state.

The second switch 112 is turned on by an on instruction from the controller 120 and turned off by an off instruction from the controller 120. When the second switch 112 is turned on, the electric power from the power source line 110 is supplied to the constant-speed motor 51, and the constant-speed motor 51 is in the power supply state. When the second switch 112 is turned off, the power supply from the power source line 110 to the constant-speed motor 51 is cut off, and the constant-speed motor 51 is in the power cutoff state.

The rotation rate controller 100 includes a frequency conversion portion 101 which changes a frequency of the electric power supplied from the power source line 110, and a rotation direction switching portion 102 which changes a rotation direction of the variable-speed motor 71.

The frequency conversion portion 101 supplies the electric power having a frequency instructed from the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction switching portion 102 is a device which changes the rotation direction of the variable-speed motor 71 by using a circuit for switching a plurality of (three in this embodiment) power source lines connected to the variable-speed motor 71. That is, the rotation direction switching portion 102 can rotate the variable-speed rotor 72 forward and in reverse.

Figure 5:
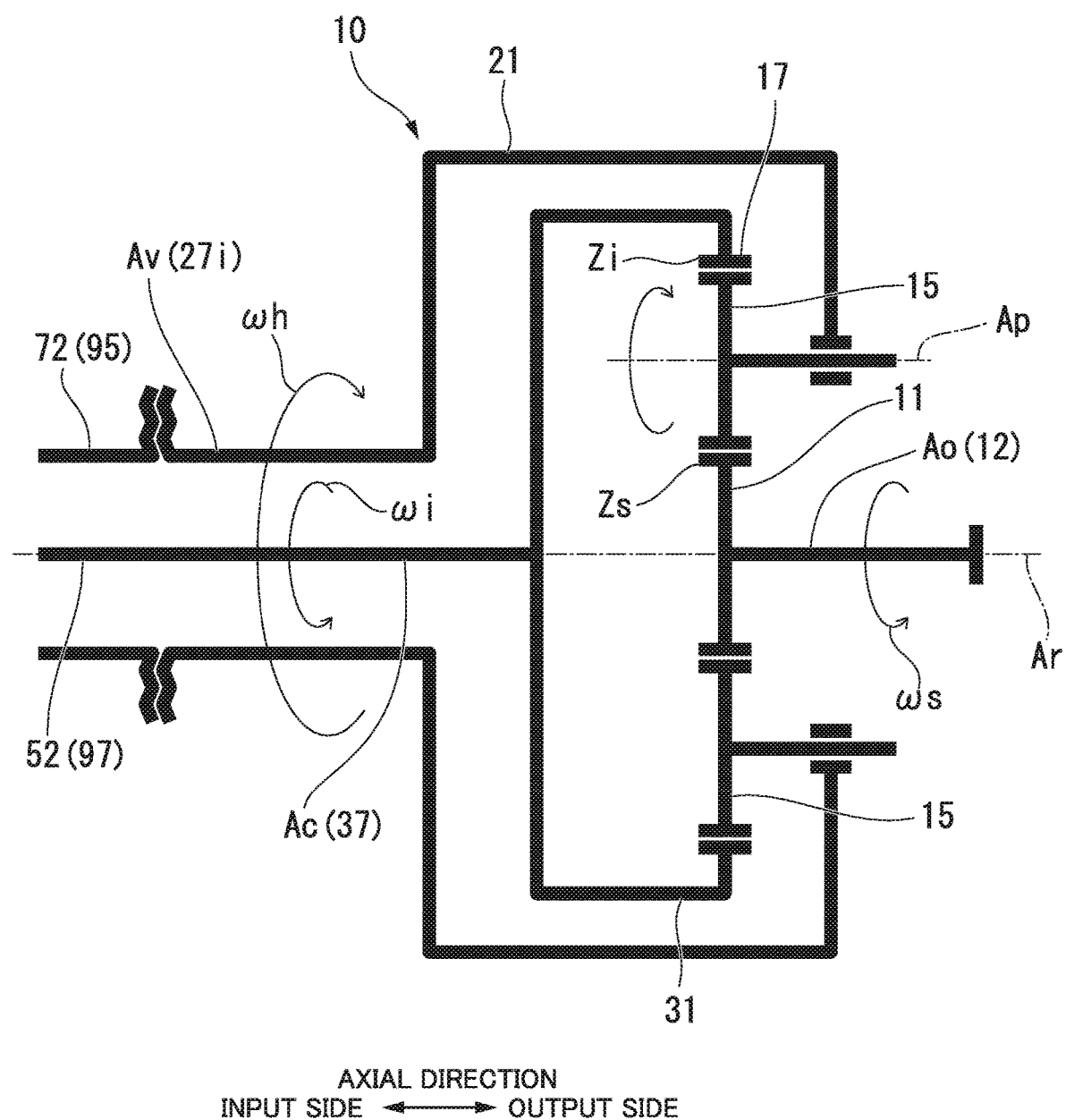
FIG. 5 is a schematic diagram showing a constitution of the transmission device according to the first embodiment of the present invention.

Here, the relationship between the number of teeth of each gear of the transmission device 10 and the rotation rate of each shaft of the transmission device 10 will be described with reference to FIG. 5.

The rotation rate of the sun gear shaft 12 that is the output shaft Ao is indicated by $\omega s$, the rotation rate of the internal gear carrier shaft 37 that is the constant-speed input shaft Ac is indicated by $\omega i$, and the rotation rate of the input-side planetary gear carrier shaft 27i that is the variable-speed input shaft Av is indicated by $\omega h$. Further, the number of teeth of the sun gear 11 is indicated by Zs, and the number of teeth of the internal gear 17 is indicated by Zi.

In this case, the relationship between the number of teeth of each gear and the rotation rate of each shaft in the transmission device 10 can be expressed by the following Formula (1):

$$\omega s/\omega i = \omega h/\omega i (1-\omega h/\omega i) \times Zi/Zs \quad (1)$$

When the constant-speed motor 51 is a four-pole induction motor and the power source frequency is 50 Hz, the rotation rate $\omega i$ (rated rotation rate) of the constant-speed rotor 52 (constant-speed input shaft Ac) is 1,500 rpm. Further, When the variable-speed motor 71 is a six-pole induction motor and the power supply frequency is 50 Hz, the maximum rotation rate $\omega h$ (rated rotation rate) of the variable-speed rotor 72 (variable-speed input shaft Av) is 900 rpm. Furthermore, it is assumed that a ratio Zi/Zs between the number of teeth Zs of the sun gear 11 and the number of teeth Zi of the internal gear 17 is 4.

In this case, when the rotation direction of the constant-speed rotor 52 (internal gear 17) is the forward rotation (rotation in the first direction) and the variable-speed rotor 72 (planetary gear carrier 21) has a maximum rotation rate (−900 rpm) in a direction opposite to the rotation of the constant-speed rotor 52 (rotation in the second direction), the rotation rate $\omega s$ of the sun gear shaft 12 which is the output shaft Ao is −10,500 rpm. This rotation rate (−10,500 rpm) is the maximum rotation rate of the sun gear shaft 12.

That is, in the transmission device 10 of the embodiment, the rotation rate $\omega s$ of the output shaft Ao becomes the maximum rotation rate when the internal gear 17 rotates in accordance with the constant-speed input shaft Ac at +1500 rpm in the forward direction and the planetary gear carrier 21 rotates in accordance with the variable-speed input shaft Av at −900 rpm in the reverse direction.

Assuming that a variable-speed range of the variable-speed input shaft Av is from −900 rpm to +900 rpm, the rotation rate ωs of the output shaft Ao lowers as the rotation rate of the variable-speed input shaft Av approaches +900 rpm.

When the rotation direction of the constant-speed rotor 52 is set to the forward rotation and the rotation direction of the variable-speed rotor 72 is the minimum rotation rate (−90 rpm) in the direction opposite to the rotation direction of the constant-speed rotor 52, the rotation rate of the sun gear shaft 12 is −6450 rpm.

When the rotation rate (rated rotation rate) of the constant-speed rotor 52 is +1500 rpm and the rotation rate of the variable-speed rotor 72 in the electric motor mode is controlled within a range of −300 to −900 rpm by frequency control of the frequency conversion portion 101, in other words, when the frequency of the electric power supplied to the variable-speed motor 71 is controlled within a range of 16.7 Hz to 50 Hz, the rotation rate of the sun gear shaft 12 which is the output shaft Ao can be controlled within a range of −7500 to −10500 rpm. This range is a variable speed range of the sun gear shaft 12 which is the output shaft Ao of the variable-speed speed increaser 1, and the variable-speed speed increaser 1 normally rotates the output shaft Ao within this variable speed range.

Next, an emergency stopping method of the variable-speed speed increaser 1 of the embodiment will be described. The emergency stop of the variable-speed speed increaser 1 includes an emergency stop of the constant-speed motor 51 and the variable-speed motor 71 due to a failure of the rotation rate controller 100 (inverter), and an emergency stop of the constant-speed motor 51 and the variable-speed motor 71 due to a power failure.

A control device (not shown) of the variable-speed speed increaser 1 of the present invention has a function of determining whether or not to cause the variable-speed speed increaser 1 to be urgently stopped. For example, when a failure of the rotation rate controller 100 is detected, the control device performs an emergency stop of the variable-speed speed increaser 1.

At this time, the control device disconnects the claw clutch 95 using the moving device 54 of the claw clutch 95. That is, the first clutch engaging element 96 and the second clutch engaging element 97 constituting the claw clutch 95 are separated from each other. Specifically, the control device generates a magnetic force by energizing the electromagnet 57 of the moving device 54. The variable-speed rotor 72 moves to the input side by the attraction force of the electromagnet 57, and the claw clutch 95 is disconnected.

According to the embodiment, it is possible to prevent the variable-speed motor 71 from rotating at a rotation rate higher than the rated rotation rate by disconnecting the claw clutch 95 when the variable-speed speed increaser 1 is urgently stopped.

Further, since the component acting in the axial direction in which the first clutch pawls 98 and the second clutch pawls 99 are disengaged does not occur from the torque of the variable-speed motor 1 acting in the circumferential direction, the first clutch engaging element 96 and the second clutch engaging element 97 are not disengaged from each other.

In addition, the moving device 54 has the electromagnet 57 which attracts the variable-speed rotor 72 using an electromagnetic force and separates the first clutch engaging element 96 and the second clutch engaging element 97 from each other. Therefore, the claw clutch 95 can be disengaged by energizing the electromagnet 57 only when the variable-speed speed increaser 1 is urgently stopped.

Second Embodiment

Hereinafter, a variable-speed speed increaser of a second embodiment of the present invention will be described in detail with reference to the drawings. In the embodiment, differences from the above-described first embodiment will be mainly described, and description of similar parts will be omitted.

Figure 6:
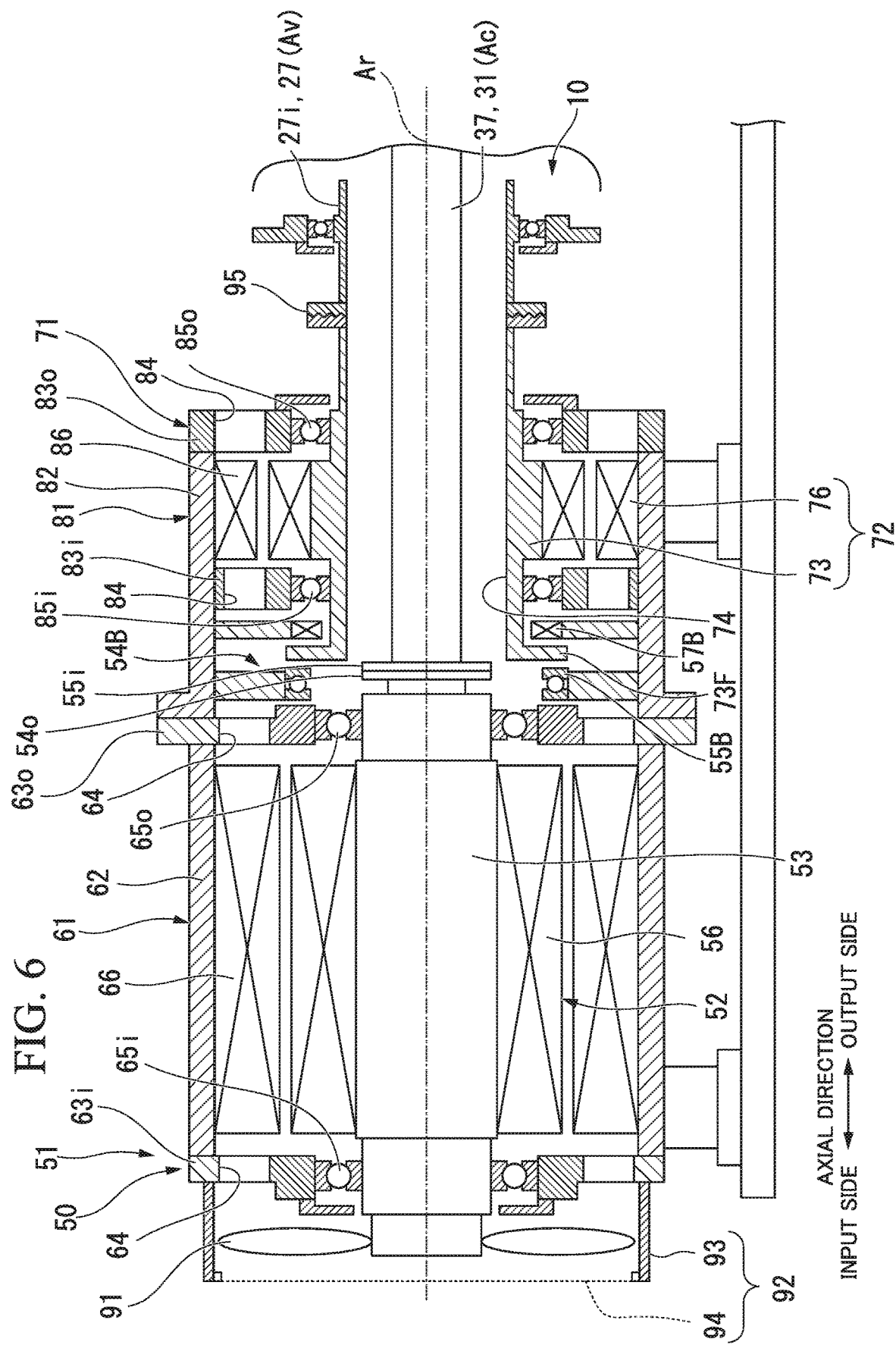
FIG. 6 is a cross-sectional view of a variable-speed speed increaser according to a second embodiment of the present invention.
Figure 7:
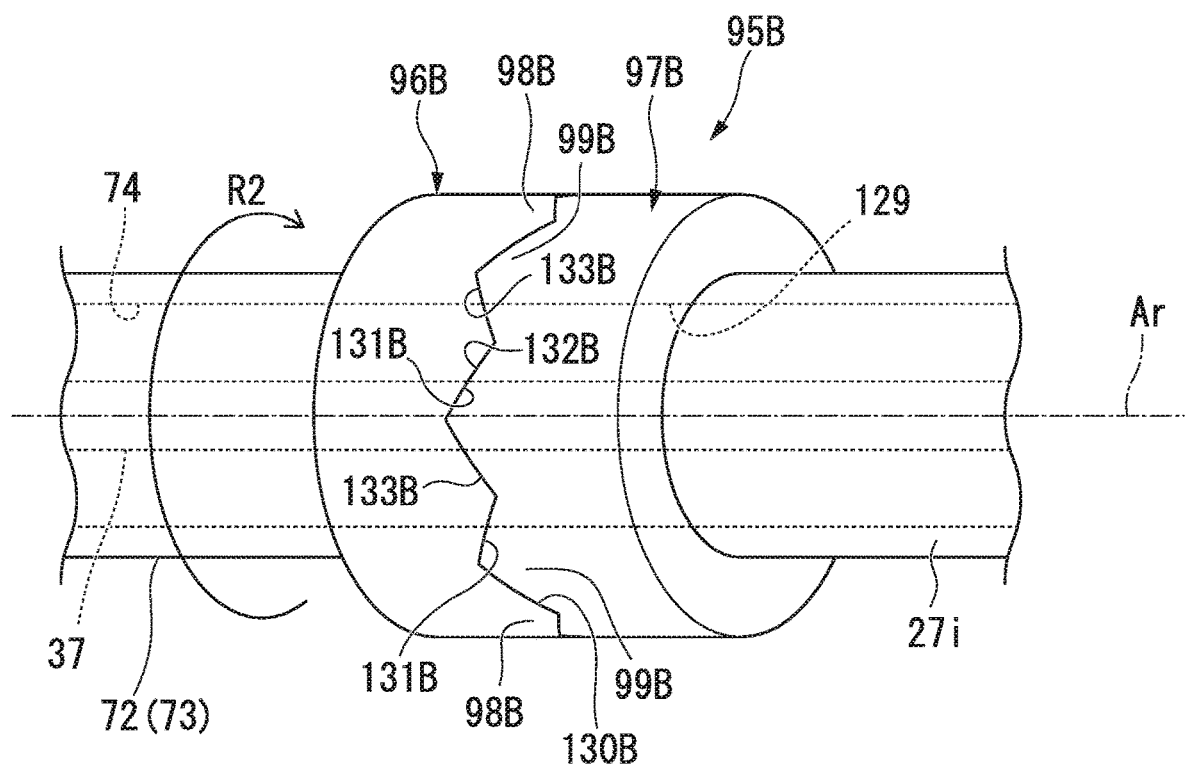
FIG. 7 is a perspective view of a claw clutch according to the second embodiment of the present invention.

As shown in FIG. 6, the claw clutch 95B of the embodiment includes a first clutch engaging element 96B provided at the end of the variable-speed rotor 72, a second clutch engaging element 97B provided at the end of the input-side planetary gear carrier shaft 27i, and a moving device 54B which disconnects the claw clutch 95.

The first clutch engaging element 96B has a plurality of first clutch pawls 98B formed at regular intervals in the circumferential direction. The second clutch engaging element 97B has a plurality of second clutch pawls 99B formed at regular intervals in the circumferential direction. The first clutch pawls 98B and the second clutch pawls 99B engage with each other.

The first clutch pawl 98B includes a first transmission surface 130B and a first inclined surface 131B which connects the distal end of the first transmission surface 130B with the proximal end of the first transmission surface 130B adjacent in the circumferential direction. The first transmission surface 130B is a surface which is inclined with respect to a plane including the axis Ar and is a surface along a plane including the axis Ar.

The first transmission surface 130B and the first inclined surface 131B are formed to be symmetric in the circumferential direction. In other words, circumferential lengths of the first transmission surface 130B and the first inclined surface 131B are substantially the same.

The second clutch pawl 99B includes a second transmission surface 132B which is in surface contact with the first transmission surface 130B, a second inclined surface 133B which connects the distal end of the second transmission surface 132B with the proximal end of the second transmission surface 132B adjacent in the circumferential direction. The second transmission surface 132B and the second inclined surface 133B are formed to be in surface contact with the first transmission surface 130B and the first inclined surface 131B.

As shown in FIG. 6, the moving device 54B includes a thrust bearing 55B and an electromagnet 57B which are fixed to the variable-speed motor casing 81. Further, a flange 73F is formed at the input-side end of the variable-speed rotor shaft 73 of the embodiment. The flange 73F is a disk-shaped member which protrudes radially outward from the input-side end of the variable-speed rotor shaft 73.

The thrust bearing 55B is disposed on the input side of the flange 73F of the variable-speed rotor shaft 73. When the variable-speed rotor 72 moves to the input side, the flange 73F comes into contact with the thrust bearing 55B.

The electromagnet 57B is disposed on the output side of the flange 73F. The variable-speed rotor shaft 73 is attracted to the output side by the electromagnetic force of the electromagnet 57B and moves.

During the normal operation, the control device of the variable-speed speed increaser 1 of the embodiment attracts the variable-speed rotor 72 to the output side by energizing the electromagnet 57B. Accordingly, the claw clutch 95B is connected.

In the case of the emergency stop method, the control device turns off the energizing of the electromagnet 57B. That is, the electromagnet 57B is turned off.

Here, since the surfaces constituting the clutch pawls 98 and 99 of the claw clutch 95B of the embodiment are both inclined with respect to the plane including the axis Ar, when the attracting by the electromagnet 57B is released, the first clutch engaging element 96B and the second clutch engaging element 97B arbitrarily disengage. That is, the claw clutch 95B is disconnected.

Further, in each of the above embodiment, a four-pole induction motor is exemplified as the constant-speed motor 51 suitable for rotating the compressor C at high speed, and a six-pole induction motor is exemplified as the variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

REFERENCE SIGNS LIST

1 Variable-speed speed increaser
10 Transmission device
11 Sun gear
12 Sun gear shaft
15 Planetary gear
17 Internal gear
21 Planetary gear carrier
22 Planetary gear shaft
23 Carrier main body
27 Planetary gear carrier shaft
27i Input-side planetary gear carrier shaft
27o Output-side planetary gear carrier shaft
31 Internal gear carrier
37 Internal gear carrier shaft
41 Transmission casing
50 Electric driving device
51 Constant-speed motor
52 Constant-speed rotor
53 Constant-speed rotor shaft
54 Moving device
55, 55B Thrust bearing
56 Conductive body
57, 57B Electromagnet
61 Constant-speed motor casing
66 Constant-speed stator
71 Variable-speed motor
72 Variable-speed rotor
73 Variable-speed rotor shaft
74 Shaft insertion hole
76 Conductive body
81 Variable-speed motor casing
86 Variable-speed stator
95, 95B Claw clutch
96, 96B First clutch engaging element
97, 97B Second clutch engaging element
98, 98B First clutch pawl
99, 99B Second clutch pawl
100 Rotation rate controller
101 Frequency conversion portion
102 Rotation direction switching portion
110 Power source line
120 Controller
121 Receiving portion
122 Interface
123 Calculating portion
130, 130B First transmission surface
131, 131B First inclined surface
132, 132B Second transmission surface
133, 133B Second inclined surface
Ac Constant-speed input shaft
Ao Output shaft
Ar Axis
Av Variable-speed input shaft
C Compressor

The invention claimed is:

1. A variable-speed speed increaser comprising:
an electric driving device which is configured to generate a rotational driving force; and
a transmission device which is configured to change the speed of the rotational driving force generated by the electric driving device and transmit the changed rotation driving force to a driving target, wherein
the transmission device comprises a sun gear which is configured to rotate about an axis, a sun gear shaft which is fixed to the sun gear and extend in an axial direction around the axis, a planetary gear which is configured to mesh with the sun gear, revolve around the axis and rotate about its own center line, an internal gear which has a plurality of teeth aligned annularly around the axis and is configured to mesh with the planetary gear, a planetary gear carrier which has a planetary gear carrier shaft extending in the axial direction around the axis and support the planetary gear to revolve around the axis and to be rotatable around a center line of the planetary gear itself, and an internal gear carrier which has an internal gear carrier shaft extending in the axial direction around the axis and is configured to support the internal gear to be rotatable about the axis,
the sun gear shaft forms an output shaft connected to the driving target, the internal gear carrier shaft forms a constant-speed input shaft, and the planetary gear carrier shaft forms a variable-speed input shaft,
the electric driving device comprises a variable-speed motor having a variable-speed rotor which is connected to the variable-speed input shaft of the transmission device and formed in a cylindrical shape centered on the axis and has a shaft insertion hole passing therethrough in the axial direction, and a constant-speed motor having a constant-speed rotor which is connected to the constant-speed input shaft of the transmission device and inserted through the shaft insertion hole,
a rotor of the driving target is disposed on the axis,
the variable-speed speed increaser further includes a claw clutch which connects the variable-speed rotor with the variable-speed input shaft, and
the claw clutch comprises a first clutch engaging element provided on a side of the variable-speed rotor, a second clutch engaging element provided on a side of the variable-speed input shaft, and a moving device which is configured to move one of the first clutch engaging element and the second clutch engaging element in the axial direction.

2. The variable-speed speed increaser according to claim 1, wherein
the first clutch engaging element has a plurality of first clutch pawls,
the second clutch engaging element has a plurality of second clutch pawls which are configured to engage with the plurality of first clutch pawls,
each of the second clutch pawls has a second transmission surface along a plane including the axis, and each of the first clutch pawls has a first transmission surface which is in surface contact with the second transmission surface and is formed so that power is transmitted from the first transmission surface to the second transmission surface during an operation of the variable-speed speed increaser.

3. The variable-speed speed increaser according to claim 1, wherein the moving device comprises an electromagnet which is configured to attract the variable-speed rotor using an electromagnetic force to separate the first clutch engaging element and the second clutch engaging element from each other.

4. The variable-speed speed increaser according to claim 1, wherein
- the first clutch engaging element has a plurality of first clutch pawls,
- the second clutch engaging element has a plurality of second clutch pawls which are configured to engage with the plurality of first clutch pawls,
- each of the second clutch pawls has a second transmission surface which is inclined with respect to a plane including the axis,
- each of the first clutch pawls has a first transmission surface which is in surface contact with the second transmission surface and is formed so that power is transmitted from the first transmission surface to the second transmission surface during an operation of the variable-speed speed increaser, and
- the moving device includes an electromagnet which is configured to attract the variable-speed rotor using an electromagnetic force to engage the first clutch engaging element and the second clutch engaging element.

* * * * *